J. H. RAMSEY.
GLARE SHIELD.
APPLICATION FILED MAR. 6, 1920.
1,413,683. Patented Apr. 25, 1922.
2 SHEETS—SHEET 1.
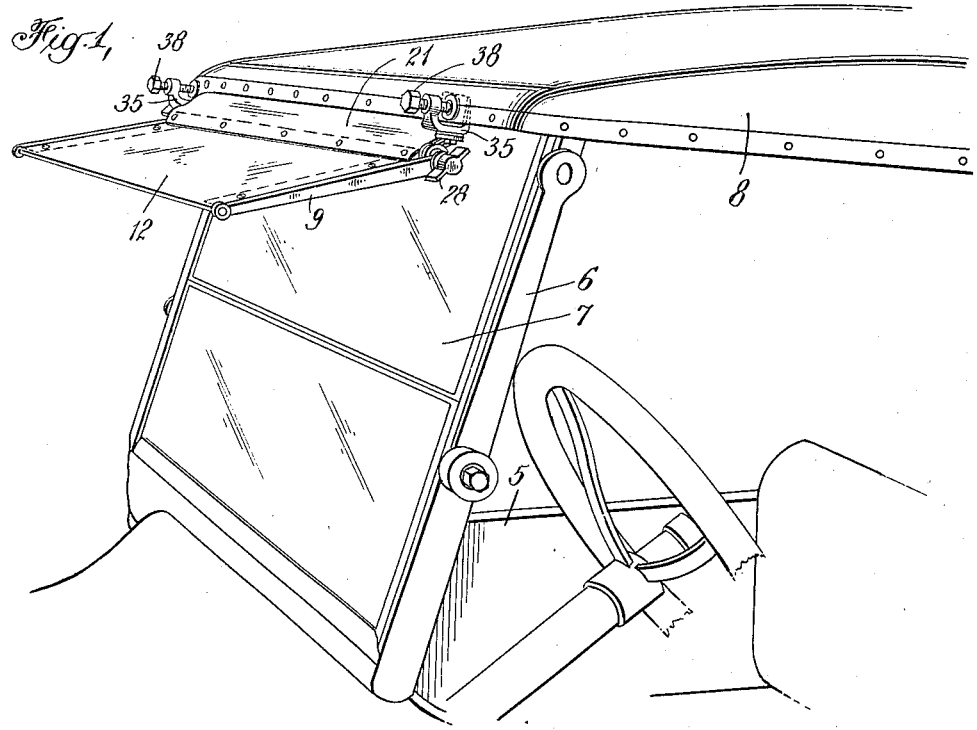
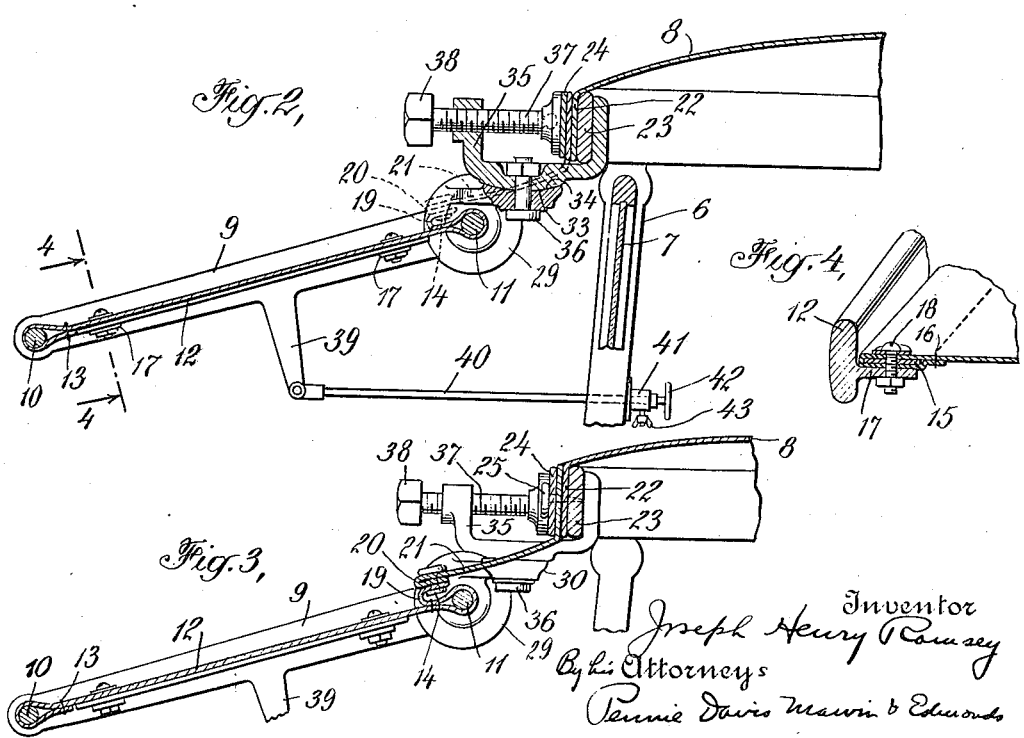
Inventor
Joseph Henry Ramsey
By his Attorneys
Pennie Davis Marvin & Edmonds

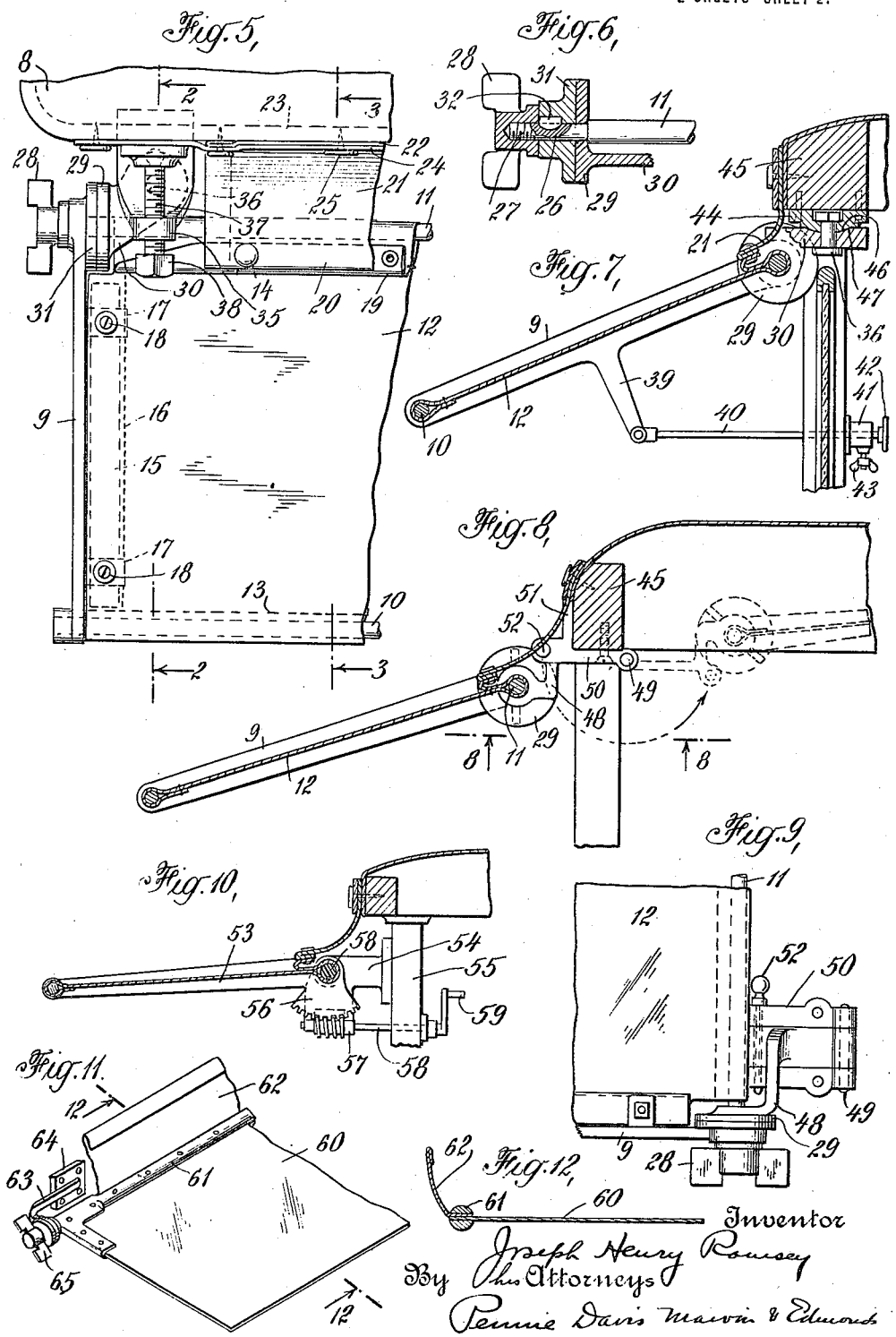

UNITED STATES PATENT OFFICE.

JOSEPH HENRY RAMSEY, OF ALBANY, NEW YORK, ASSIGNOR TO ALBANY MACHINE AND TOOL COMPANY, OF ALBANY, NEW YORK, A COPARTNERSHIP CONSISTING OF JOSEPH H. RAMSEY AND ANTHONY N. B. FARRELL.

GLARE SHIELD.

1,413,683.      Specification of Letters Patent.      Patented Apr. 25, 1922.

Application filed March 6, 1920. Serial No. 363,642.

*To all whom it may concern:*

Be it known that I, JOSEPH HENRY RAMSEY, a citizen of the United States, residing at 86 Chestnut Street, Albany, in the county of Albany, State of New York, have invented certain new and useful Improvements in Glare Shields; and I do hereby declare the following to be a full, clear, and exact description of the invention, such as will enable others skilled in the art to which it appertains to make and use the same.

This invention relates to glare shields for motor driven vehicles, the purpose of the invention being to prevent the light reflected by the wind shield from obscuring the vision of the driver of the vehicle.

Motor driven vehicles are commonly provided with glass wind shields to protect the occupants of the vehicle from the effects of wind, dust and rain. Such wind shields are frequently disposed at an angle such that light is reflected therefrom and partially obscures the driver's vision. This is particularly true when the vehicle is operated in strong sun-light or at night in passing illuminating devices in the road. Various attempts have been made in the past to provide glare shields to overcome the difficulty experienced because of the reflection of light by the wind shield. Such devices have, however, been so constructed that a space is formed between the rear edge of the glare shield and the face of the wind shield, thus permitting the entrance of water, which, upon contact with the wind shield, forms a film and obscures the view of the driver.

The object of the present invention is primarily to provide a glare shield of simple and rigid construction which will effectively exclude water from the wind shield and at the same time prevent light from striking the wind shield in such a manner as to obscure vision therethrough.

A further object of the invention is the provision of a light and simple glare shield structure which, may be readily applied to the vehicle, when so applied is comparatively inconspicuous and which may be operated if desired, from the interior of the vehicle.

A further object of the invention is the provision of simple and effective fastening means for the glare shield and particularly the arrangement of such fastening means so that it is self-adjusting when applied and cannot become loosened or disengaged through vibration of the parts during the operation of the vehicle.

Further objects and advantages of the invention reside in the various combinations hereinafter described and claimed as will be apparent upon reference to the following specification and to the accompanying drawing in which—

Fig. 1 is a view in perspective of a portion of a motor-driven vehicle of the open type showing the glare shield in place;

Fig. 2 is a section through a portion of the vehicle and the glare shield illustrating a clamp for fastening the glare shield in place;

Fig. 3 is a similar section in a plane intermediate the clamps;

Fig. 4 is a section on the line 4—4 of Fig. 2;

Fig. 5 is a plane view of a portion of the glare shield illustrating the manner in which it is supported upon the vehicle;

Fig. 6 is a detail in section illustrating the means for clamping the glare shield at the desired angle;

Fig. 7 is a sectional view illustrating a slightly different fastening means for the glare shield adapted for application to vehicles of the closed type;

Fig. 8 is a sectional view illustrating another form of fastening means which is particularly adapted to permit folding of the glare shield into the top of the vehicle;

Fig. 9 is a plan view of the fastening means illustrated in Fig. 8;

Fig. 10 is a diagrammatic illustration of means for adjusting the angular position of the glare shield;

Fig. 11 is a view in perspective of another form of glare shield; and

Fig. 12 is a section on the line 12—12 of Fig. 11.

A particular feature of my invention which makes it superior to glare shields, as heretofore known or used, is the flap or apron which is permanently secured to the vehicle top and is preferably detachably secured to the glare shield, in such a manner as to prevent the entrance of water between the rear edge of the glare shield and the wind shield and between the upper edge of the wind shield and the top of the vehicle.

The flap or apron preferably comprises a strip of fabric, one edge of which may be secured beneath the binding strip of the vehicle top, in a vehicle of the open type. The edge of the strip may be fastened in any suitable manner and some variation in the mode of fastening the strip is necessary to permit its application to vehicles of different form and construction. Another feature of the invention is the provision of a locking device for holding the glare shield in adjusted position which is so constructed as to prevent accidental loosening of the fastening means. Preferably, wing nuts are employed to secure the glare shield in proper angular position, but in ordinary forms of construction the wing nuts would readily be loosened and the shield would become ineffective. According to my invention, a frame is provided, the side arms of which are keyed to a longitudinal member having reduced ends to provide a shoulder against which discs, formed on the supporting brackets, rest, the reduced extensions passing loosely through openings in the discs. The side arms are provided with cooperating discs and wing nuts are threadedly mounted on the ends of the extensions. When the wing nuts are screwed up the discs are forced together. If the glare shield tends to sag, the wing nuts rotate with the side arms. Being thus immovable relatively to the side arms, the wing nuts cannot be inadvertently loosened.

Other features of the invention involve the provision of means extending to the interior of the vehicle for adjusting the angular position of the glare shield, in which event the fastening means described, are not required. The glare shield may be secured to the vehicle by clamps carrying the supporting brackets or by replacing the clamps with suitable screw plates, which similarly support the brackets. The clamps or screw plates are preferably formed with rounded seats and the brackets with cooperating sockets so that the clamps or screw plates are self-adjusting with respect to the frame of the glare shield. The fastening means may be so formed as to provide hinges about which the glare shield may be swung into the interior of the vehicle top. When the vehicle is of the open type, the top with the glare shield may be thrown back in the usual manner and the glare shield is disposed so as not to interfere with this operation.

Referring to the drawing for more specific details of the invention, 5 indicates the body of a vehicle having a wind shield frame 6 and wind shield 7, and a top 8, all of the usual form and construction.

The glare shield perferably comprises side arms 9 and connecting rods 10 and 11. A sheet of material 12, preferably water-proof fabric, is stretched over the rods 10 and 11 and secured at 13 and 14, preferably by stitching. In order that the sheet 12 may be held taut, I prefer to provide strips 15 of metal or other suitable material extending along the side arms 9 and about which the material is disposed and fastened, preferably by stitching as at 16. The side arms are provided with spaced lugs 17 and bolts 18 are secured through openings in these lugs and in the strips 15 and fabric 12 is secure the latter firmly in its proper relation to the frame. The fabric, once secured in this manner, is permanently stretched, closes the entire space between the said arms and provides a glare shield which may be depended upon to give satisfactory service for an extended period.

Adjacent the stitching 14, a loose edge 19, of the fabric is turned back and is preferably provided with a row of snap fasteners 20. A flap or apron 21 carries the cooperating parts of the snap fasteners 20 so that the edge of the flap and apron may be detachably secured together, in such a manner that, the apron overlaps the glare shield. The other edge of the apron is disposed between the top cover 22 supported on a bow 23 forming the frame of the top and a binding strip 24 which is normally provided as a finish for the top. In securing the apron in place, the tacks 25, which usually hold the binding strip in place, are removed and replaced after the edge of the apron has been disposed as illustrated in the drawing.

The rod 11 is provided with reduced extensions 26, threaded at 27 to receive wing nuts 28. Discs 29, carrying brackets 30, rest against the shoulders formed by the reduced extensions. The side arms 9 carry co-operating discs 31 and are secured to the reduced extensions by keys 32 so that the side arms are rigid with respect to the rod 11 which must rotate if the angular position of the glare shield varies. The wing nuts 28 clamp the discs 29 and 31 together, and thus frictionally hold the glare shield in its adjusted position. The brackets 30 are provided with dished sockets 33 to receive co-operating seats formed on clamps 35 which are secured to the brackets by bolts 36. The openings through which the bolts 36 extend, may be sufficiently enlarged to allow a certain amount of play and the spherical joint between the brackets and clamps permits relative movement of the clamps when the latter are secured in place. The clamps are adapted to grip the bow 23 as indicated in the drawing by adjustment of screws 37, which are preferably provided with hexagonal heads 38. Thus the glare shield may be readily secured in proper relation to the top and wind shield of the vehicle and may be adjusted at the desired angle. In certain cases it may be desirable to permit adjustment of the angular relation to the glare shield from the interior of the vehicle and in this event, the clamping means above described may be omitted and an arm 39 is provided on one of the side arms 9. A rod 40, connected to the arm 39 passes through a suitable opening on a support 41 secured to the wind shield frame. The rod 40 may be provided with a handle 42 and the rod is held in adjusted position by a clamping screw 43, mounted in the support 41.

As will be readily understood, should it be desirable to remove the glare shield, the clamps 35 may be readily released after the apron 21 has been separated from the flap 19 and the glare shield may be as readily secured in operative position. It will be noted that the apron 21 provides an extension of the top which forms a perfect water shed and thus prevents the access of water to the wind shield. This arrangement is of particular advantage in rainy weather when the wind shield is liable to be otherwise obscured by the moisture film accumulating thereon. This feature of my invention has never, to my knowledge, been employed heretofore in the construction of glare shields and it is my intention, therefore, to claim this construction and modifications thereof, whereby the same result is accomplished.

In Fig. 7 of the drawing, a form of my invention is illustrated, which is particularly adapted for vehicles of the closed type. The general structure is identical with that hereinbefore described and the same reference numerals are applied to the several parts. The distinctive feature of this form of my invention is the provision of a screw plate 44 which is adapted to be secured to the under side of the vehicle top 45. The screw plate is provided with a spherical seat 46 resting in a socket 47 of the bracket 30 hereinbefore described, the plate and bracket being secured together by the bolt 36. The plate 44 is interchangeable with the clamp 35 so that my invention is applicable without material change to either type of vehicle.

In Fig. 8 and 9, another form of fastening device is disclosed, the general structure of the glare shield being identical with that hereinbefore described and the same reference numerals being applied thereto. Brackets 48 are supported on the rod 11 and are hinged at 49 to screw plates 50 having arms adapted to embrace the top bow of the vehicle and to be secured thereto by the insertion of suitable screws 51. The brackets 48 are normally held by pins 52, which extend through suitable openings provided in the plates 50 and the brackets, in proper relation to hold the glare shield in the position indicated in full lines in Fig. 8. When the pins 52 are removed, however, the brackets 48 are permitted to swing as indicated by the arrow in Fig. 8 to the position indicated in dotted lines therein, carrying the glare shield into the interior of the top. With the glare shield in this position, the top may be thrown back and the glare shield will rest between the folds thereof, and thus be safely and inconspicuously stored. The brackets 48 are preferably constructed of malleable metal and are so formed that they may be readily bent to adjust them to any irregularity of the vehicle top to which they are secured.

In Fig. 10 I have illustrated means for adjusting the angular position of the glare shield 53, which is supported by brackets 54 on the wind shield frame or other rigid part 55 of the vehicle. A toothed segment 56 is keyed to a rod 58 which is supported in the brackets and forms a part of the frame of the wind shield; and a worm 57, meshing with the segment, is supported on a shaft 58, carrying an operating handle 59 and also supported in the wind shield frame 55. By actuating the handle 59 the segment 56 may be moved to carry the glare shield in either direction. No locking means is necessary since the worm and segment are self locking.

In Figs. 11 and 12, the glare shield is formed preferably from a sheet 60 of metal, fibre board, or other suitable material and is supported at one edge by a metal frame 61 to which the edge of an apron 62 is also fastened, the apron being adapted to be secured to the top of the vehicle to shed water as hereinbefore described. The frame 61 is supported in brackets 63 and is clamped in adjusted position by wing nuts 64, the construction being similar to that illustrated in Fig. 6 and hereinbefore described. The brackets 63 are provided with screw plates 64 which may be secured to any rigid portion of the vehicle. This form of my invention is adapted to provide a relatively inexpensive and durable glare shield which may be headily adjusted to the desired position and which will not only eliminate reflection of light on the wind shield, but will prevent access of water thereto.

From the foregoing it will be apparent that I have devised a novel glare shield which presents numerous advantages and is capable of beneficial use in connection with various types of vehicles. The glare shield successively overcomes the difficulty encountered by reason of light reflection on the wind shield and permits safer and more satisfactory operation of motor driven vehicles.

Various changes may be made in the form, arrangement, and construction of the parts without departing from the invention or sacrificing any of the material advantages thereof.

I claim:

1. In a device of the character described, the combination of a glare-shield, means for adjustably supporting the same from the top of a motor-driven vehicle, and an apron secured to the top of the motor vehicle and to the glare-shield to close the space between them, said apron permitting adjustment of the glare-shield to all of its angular positions.

2. In a device of the character described, the combination of a glare-shield, means for adjustably supporting the same from the top of a motor-driven vehicle, and an apron sesured to the top of the motor vehicle and detachably connected with the glare-shield to close the space between them, said apron permitting adjustment of the glare-shield to all of its angular positions.

3. In a device of the character described, the combinatiton of a shield embodying a frame, said frame including a rod having reduced extensions at opposite ends and side arms rigidly secured to the rod, brackets at the inner side of said arms for supporting the frame and having friction elements, cooperating friction elements at the inner side of said arms, and means abutting against the outer side of said arms for clamping the friction elements.

4. A glare-shield for motor vehicles comprising a frame including a rod having reduced end portions forming a shoulder at each end of the rod, side arms rigidly secured to the reduced portions of the rod, a supporting bracket adjacent the inner side of each arm and having a portion adapted to be clamped between the corresponding shoulder on the rod and the inner side of the corresponding arm, and means having threaded engagement with the extremities of the rod and engaging the outer faces of the side arms to frictitonally clamp said portions of the brackets between said shoulders and the inner sides of said arms.

5. In a device of the character described, the combination of a glare-shield for motor driven vehicles, brackets for supporting the same in forwardly projecting relation to the top of the vehicle, means for securing the brackets to the vehicle, and ball and socket connections between the brackets and said last mentioned means whereby the brackets and said means are relatively adjustable for the purpose described.

In testimony whereof I affix my signature.

JOSEPH HENRY RAMSEY.